United States Patent
Brynolf et al.

(10) Patent No.: US 11,566,084 B2
(45) Date of Patent: Jan. 31, 2023

(54) METHOD FOR PREPARING AN INHIBITED STARCH

(71) Applicant: SVERIGES STÄRKELSEPRODUCENTER, FÖRENING U.P.A., Fjälkinge (SE)

(72) Inventors: Mikael Brynolf, Kristianstad (SE); Åke Ståhl, Sösdala (SE); Mathias Samuelsson, Kristianstad (SE)

(73) Assignee: SVERIGES STÄRKELSEPRODUCENTER, FÖRENING U.P.A., Fjälkinge (SE)

( * ) Notice: Subject to any disclaimer, the term of this patent is extended or adjusted under 35 U.S.C. 154(b) by 235 days.

(21) Appl. No.: 16/637,648

(22) PCT Filed: Jul. 11, 2018

(86) PCT No.: PCT/SE2018/050759
§ 371 (c)(1),
(2) Date: Feb. 7, 2020

(87) PCT Pub. No.: WO2019/032011
PCT Pub. Date: Feb. 14, 2019

(65) Prior Publication Data
US 2020/0270370 A1 Aug. 27, 2020

(30) Foreign Application Priority Data
Aug. 11, 2017 (SE) .................................. 1750986-0

(51) Int. Cl.
*C08B 31/18* (2006.01)
*A23L 5/20* (2016.01)
(Continued)

(52) U.S. Cl.
CPC ............ *C08B 31/18* (2013.01); *A23L 3/3508* (2013.01); *A23L 3/3544* (2013.01); *A23L 5/273* (2016.08);
(Continued)

(58) Field of Classification Search
CPC ....... C08B 31/18; C08B 31/185; A23L 5/276; A23L 5/273; A23L 29/219; A23L 3/3508; A23L 3/3544
(Continued)

(56) References Cited

U.S. PATENT DOCUMENTS 2,317,752 A 4/1943 Fuller
3,463,668 A 8/1969 Evans et al.
(Continued)

FOREIGN PATENT DOCUMENTS

CA 2 976 322 A1 8/2016
CN 1549828 A 11/2004
(Continued)

OTHER PUBLICATIONS

Office Action and Search Report dated Sep. 24, 2021, issued in corresponding RU Application No. 2020107451/04, filed Jul. 11, 2018, 17 pages.
(Continued)

*Primary Examiner* — Helen F Heggestad
(74) *Attorney, Agent, or Firm* — Christensen O'Connor Johnson Kindness PLLC

(57) ABSTRACT

A method for preparing an inhibited starch, wherein it comprises the steps of a) providing a slurry containing a native granular starch obtained from a starch containing raw material, b) alkalizing the slurry by adding ammonia or by adding one or more compounds having the ability to release or produce ammonia in the slurry, c) adjusting the pH of the slurry to a value between 7 and 10, d) adding at least one
(Continued)

oxidant being a source of active chlorine to the slurry for a reaction with said ammonia, e) adding at least one organic acid or a bisulfite to the slurry with a view to eliminating any residual oxidant, off-taste, and undesired smell, and f) adding at least one antioxidant to the slurry with a view to stabilizing the achieved inhibition of the starch during prolonged warehouse storage, is disclosed, as well as a starch having increased viscosity when cooked in hard water compared to when cooked in distilled water; an inhibited starch prepared with the method according to the present invention; use of said inhibited starch in a food product; and a food product containing said inhibited starch.

17 Claims, 4 Drawing Sheets

(51) Int. Cl.
   *A23L 29/219* (2016.01)
   *A23L 3/3508* (2006.01)
   *A23L 3/3544* (2006.01)

(52) U.S. Cl.
   CPC .............. *A23L 5/276* (2016.08); *A23L 29/219* (2016.08); *C08B 31/185* (2013.01); *A23V 2002/00* (2013.01)

(58) Field of Classification Search
   USPC .................. 426/539, 541, 549, 615, 661
   See application file for complete search history.

(56) References Cited

U.S. PATENT DOCUMENTS

| | | | |
|---|---|---|---|
| 3,490,917 | A | 1/1970 | Doe et al. |
| 3,977,897 | A | 8/1976 | Wurzburg et al. |
| 4,303,451 | A | 12/1981 | Seidel et al. |
| 4,303,452 | A | 12/1981 | Ohira et al. |
| 5,725,676 | A * | 3/1998 | Chiu et al. |
| 6,235,894 | B1 | 5/2001 | Kettlitz et al. |
| 8,268,989 | B2 | 9/2012 | English et al. |

FOREIGN PATENT DOCUMENTS

| | | | |
|---|---|---|---|
| CN | 101519455 A | | 9/2009 |
| CN | 104231094 A | | 12/2014 |
| CN | 104262494 A | | 1/2015 |
| CN | 104411727 A | | 3/2015 |
| CN | 105754524 A | | 7/2016 |
| CN | 106517849 A | | 3/2017 |
| EP | 1038882 A1 | | 1/1995 |
| EP | 0721471 A1 | | 7/1996 |
| GB | 2506695 A | | 4/2014 |
| JP | 61-254602 A | | 11/1986 |
| JP | 9-503549 A | | 4/1997 |
| JP | 10-53601 A | | 2/1998 |
| JP | 2007-532733 A | | 11/2007 |
| JP | 2015-532327 A | | 11/2015 |
| RU | 2159252 C1 | | 11/2000 |
| RU | 2593876 C2 | | 8/2016 |
| SU | 442185 A1 | | 9/1974 |
| SU | 1735465 A1 | | 5/1992 |
| WO | 96/04315 A1 | | 2/1996 |
| WO | 2005/100407 A1 | | 10/2005 |
| WO | 2013/173161 A1 | | 11/2013 |
| WO | 2014/053833 A1 | | 4/2014 |
| WO | 2016/133447 A1 | | 8/2016 |
| WO | WO2016/133447 | * | 8/2016 |
| WO | 2016/156009 A1 | | 10/2016 |

OTHER PUBLICATIONS

E.I. Koptelova, et al. "Influence of technological parameters on the rheological properties of cross-linked starches," Achievements of Science and Technology. Agroindustrial Complex. Processing, 2014, T. 28, No. 10 (p. 69-71), see p. 71, col. 2, section "Conclusions" and English translation, 4 pages total.

Moskvichev Yu.A., et al., "Theoretical foundations of chemical technology", Textbook. 2nd ed., Rev. St. Petersburg, Publishing house "Lan", 2016, see p. 6, paragraphs 3-4 and English translation, 4 pages total.

European Extended Search Report dated Apr. 29, 2021, issued in corresponding European Application No. 18 84 5258.5, filed Jul. 11, 2018, 2 pages.

Jiang, F., et al., "The Preparation, Formation, Fermentability, and Applications of Resistant Starch," International Journal of Biological Macromolecules, vol. 150, pp. 1155-1161, available online Nov. 2019.

Khoozani, A.A., et al., "Resistant Starch Preparation Methods," Encyclopedia of Food Chemistry, Jan. 2019, 6 pages.

Notice of First Review Opinion dated Aug. 3, 2021, issued in corresponding CN Application No. 201880051708.6, filed Jul. 11, 2018, 15 pages.

International Search Report dated Sep. 21, 2018, issued in corresponding International Application No. PCT/SE2018/050759, filed Jul. 11, 2018, 5 pages.

Written Opinion dated Sep. 21, 2018, issued in corresponding International Application No. PCT/SE2018/050759, filed Jul. 11, 2018, 8 pages.

Norman, M.F., "LXXIV. The Oxidation of Amino-Acids by Hypochlorite. I. Glycine.," Biochem J. 30(3):484-96, Mar. 1936.

Sawamura, R., et al., Mechanisms of Chloramine and Cyanogen Chloride Formatio from Glycine (REgular Presentations, Proceedings of the 9th Symposium on Environmental Pollutants and Toxicology), Eisei Kagaku, vol. 28, p. 38, 1982.

Office Action/Search Report dated Jun. 13, 2022, issued in corresponding BR Application No. 2020107451/04, filed Jul. 11, 2018, 8 pages.

Office Action and Search Report dated May 10, 2022, issued in corresponding JP Application No. 2020-530415, filed Jul. 11, 2018, 9 pages.

* cited by examiner

METHOD FOR PREPARING AN INHIBITED STARCH

TECHNICAL FIELD OF THE INVENTION

The present invention refers to a method for preparing inhibited starch with improved warehouse storage stability, to a starch having increased viscosity when cooked in hard water compared to when cooked in distilled water, to an inhibited starch prepared with the method according to the present invention, to use of said inhibited starch in a food product, and to a food product containing said inhibited starch.

BACKGROUND ART

Starch is an important ingredient for the food industry and is commonly used in multiplicity of food applications and food production processes. Natural, non-modified starch, known by skilled persons in the art as "native starch", is sometimes used as such but has several drawbacks in terms of maintaining short texture in food products industrially processed. To overcome the negative cohesive and long stringy textures after such processes it is common to inhibit the starch granules so that they keep the granular structure when these swell during a cook, after they have reached the gelatinization point, until the full heating in the process is reached. This is done today by use of chemical crosslinking agents reacted onto the starch before it is used by the food industry, thus making the starch an additive and rendering it to be declared as such under the term "Modified starch" or "Food starch-modified", eventually with its E-number.

In recent years' the consumer's attitude towards additives and E-number have become more and more negative and the food industry wants to switch over to use ingredients which do not need to be declared as an additive on the package of the final consumer product, rather only ingredients.

The primary technical function of starch in food applications is as thickening agent with a view to provide the requested viscosity, texture and mouth feel for the food products. The texture and viscosity property are built up by hydration of the granular starch achieved when the granular starch is heated in an aqueous suspension. The granular starch absorbs water when the temperature is increased above the gelatinization temperature, i.e. the starch granule is being hydrated and swollen, and its viscosity is considerably increased. In the case of using native starch the hydrated and swollen starch granules are fragile and, consequently, if the temperature is kept for longer time or is increased to higher temperatures the viscosity will reach its so called "peak viscosity". Accordingly, the granular shape will be disrupted and disintegrate. The viscosity will be significantly reduced. Besides the reduced viscosity, another unwanted result will be an unpleasant long and cohesive texture. When the cook is performed in an acid environment and/or together with mechanical shearing actions the breakdown process of the granular structure is further accelerated.

As a result of the above mentioned problem the most important parameters to control or to avoid are high temperatures, shear forces, and, particularly, acidic conditions. It is desirable to change the starch property so that the viscosity is stable or that it even increase over the cooking time, thus avoiding viscosity decrease and granule breakdown when treated under high heat, strong shear force, and/or acidic conditions to maintain the starch granule in a hydrated and highly swollen and intact state.

The requested effect is often referred to as increased starch robustness. Thus, such a granular starch is more resistant to high temperatures, to longer heating times, to strong shear forces, and to acidic conditions or combinations of these parameters.

The most commonly used method to give starch increased process tolerance is to use the technique known as chemical cross-linking, a starch modification process.

Chemical cross-linking inhibits the starch granule so that when it is heated in water the granule swelling, after reaching the gelatinization point, is inhibited. If the level of cross-linking is too low a continued heating combined with strong physical force will end up in a total or partial starch solution. Chemical cross-linking prevents granular breakdown under such treatments. The chemical cross-linking is achieved by substituting the starch with bi-functional reagents, resulting in a covalent bond between the starch molecules. This can be done with certain approved methods and chemicals for food additives, e.g. phosphorus oxychloride, STMP (sodium trimetaphosphate), adipic-acetic mixed anhydride, and epichlorohydrin (nowadays not used for food purposes anymore, but have been so in the past). The different approved methods for chemical cross-linking are well described in literature and are commonly used in the starch industry to inhibit the starch. In practice, this means that by cross-linking of the starch granule it will be capable of maintaining its granular integrity when exposed to temperatures and high shear force or at high temperatures without or together with a degree of shear. The higher the degree of cross-linking, the more robust the starch will be against high temperature, shear forces and acidic conditions or combinations of those parameters.

In practice, these cross-linking techniques for modification of the swelling of the starch granules can be adapted to the application and the process which the starch is to be used in, so that optimal properties in the form of viscosity and texture are obtained due to the starch as such.

In the food industry, there is a great desire to replace chemically modified starches with starches that are not chemically modified, due to the trend to go "natural" among food ingredients. The starch shall still have equal properties as the chemically modified ones, i.e. rendering the native starch properties to become like the same properties obtained with the chemically modified starches.

Inhibition of starch granules without chemical reagents is known before and can be performed with dry heat inhibition at alkaline condition, also called alkaline dry roasting, similar to the manufacturing of so called British Gums. In this method the starch is subjected to high temperatures at almost moisture free condition in combination with an alkaline pH, which is reached by addition of e.g. sodium hydroxide or soda. Temperatures of 120-160° C. at a pH of 8-11 and a reaction time of 2-120 hours give different inhibition levels. This technique is well known and disclosed in the literature (Cross-linking of starch by Alkali Roasting, Journal of Applied Polymer Science Vol. 11 PP 1283-1288 (1967); IRVIN MARTIN, National Starch & Chemical Corporation), and also in several patents (U.S. Pat. No. 8,268, 989 B2; EP 0 721 471; EP 1 0382 882; U.S. Pat. Nos. 3,977,897; 4,303,451; Japanese Patent No 61-254602; U.S. Pat. Nos. 4,303,452; and 3,490,917).

The problem with dry heat inhibition of starch is that side reactions takes place and gives an undesirable taste and color to the starch. Discoloration of the dry starch at alkaline pH occurs at temperatures above approximately 130° C. To avoid problems with side reactions the temperature can be reduced, but this causes the reaction time to be prolonged and thereby increase the production cost significantly. Furthermore, the heat inhibition technology requires high energy costs as almost all moisture has to be driven away and this step absorbs a lot of energy. On top of this high investment costs are needed as special equipment need to be used.

Another variant on the above patent is disclosed in WO 2013/173161 A1 which uses alcohol to dehydrate the starch and heat the starch/alcohol suspension under high pressure and temperature in an alkaline environment. The color of the starch is improved as the colored compounds formed are extracted with the use of alcohol, but as it uses flammable solvents under high pressure and temperatures it is a hazard for creating an explosion during the treatment. The process also needs very expensive pressure reactors to keep the alcohol in a liquid state at the very high temperatures used which makes it costly.

It is further known that weak inhibition can be achieved by subjecting the starch granule with low concentrations of a bleaching agent, i.e. an oxidant (oxidizing agent) at an alkaline pH together with protein residuals. In some cases, the residual protein in the starch granule remaining after extraction can be used, but it generally needs less pure starches than the nowadays commercial starches have, i.e. above 0.4% protein content of starch dry matter. This inhibition technology is known and is disclosed in U.S. Pat. No. 2,317,752 and in the UK Patent Application GB 2506695. However, the latter two methods for inhibiting the starch can be performed only to limited levels. If higher levels of oxidants are added the starch will be oxidized instead, leading to a de-polymerization which results in reduced viscosity and an easier disruption of the granular structure during the cook of it.

It is also known that inhibition of granular starch can be achieved by combining an oxidant and the amino acid glycine. This process is disclosed in U.S. Pat. No. 3,463,668. However, this method results in an unstable, temporarily inhibition and is thereby not capable of replacing chemically cross-linked granular starches as used in the food industry as it will be stored for a time in the warehouses before being used.

How to stabilize an inhibited starch using the described procedure in the U.S. Pat. No. 3,463,668 during an extended warehouse storage time until it is used by the food industry, i.e. not changing its swelling behavior over time when being stored, is described in WO 2016/133447 A1. In this application the use of residual proteins in the starch and/or added amino acids or other low molecular weight peptides is used for making the inhibition together with low level of sodium-hypochlorite so that the obtained inhibition is stabilized during the storage time in the warehouse by adding antioxidants to the starch and thus changing the temporarily inhibition described in the U.S. Pat. No. 3,463,668 to become stable.

Adding foreign protein sources to the starch or relay upon its own residual protein content is a hazard for obtaining a starch which needs to be labelled as an allergen on the food products label as it is difficult to fully being capable of washing it away. This shows that there is still a need to develop a method for inhibiting starches to higher levels without any need to add proteinaceous- or protein derived materials, i.e. a method which results in inhibited starch with improved properties like taste, smell and color, and, at the same time are more cost effective than traditional techniques to produce and overcome the drawbacks with earlier described techniques. Proteins, peptides and amino acids are also costly materials so eliminating these ones will automatically reduce production costs.

Using hypochlorite or hypochlorous acid to oxidize or bleach a starch in water solution at alkaline pH, i.e. a pH>7, needs to be used in order to control the hazard of forming toxic chlorine gas, which otherwise will be formed in an acid environment. The alkaline agent used is generally some kind of hydroxide solution, even though hypochlorite salt solutions are alkaline on its own. This is due to that pH drops after addition when using only hypochlorite as an alkali agent. The reason is that the produced carboxylic acids in the starch which forms from the oxidation by the used hypochlorite and this gives acids which lowers the pH during the reaction.

SUMMARY OF THE INVENTION

The object with the present invention is to fulfill the above-mentioned needs, to eliminate the problems disclosed, and to provide an inhibited starch having the desired advantageous properties disclosed. This object is achieved with the method according to the present invention as defined in claim 1. This object is also achieved with the inhibited starch being stabilized for extended storage conditions, with use thereof as an ingredient in food products and with a food product containing said inhibited starch as defined in the subsequent independent claims. Specific and preferred embodiments are disclosed in the dependent claim.

In one aspect the present invention refers to a method for preparation of inhibited starch, wherein it comprises the steps of a) providing a slurry containing a native granular starch obtained from a starch containing raw material,
b) alkalizing the slurry by adding ammonia or by adding one or more compounds having the ability to release or produce ammonia in the slurry,
c) adjusting the pH of the slurry to a value between 7 and 10,
d) adding at least one oxidant to the slurry for a reaction with said ammonia,
e) adding at least one organic acid or a bisulfite to the slurry with a view to eliminating any residual oxidant, off-taste, and undesired smell, and
f) adding at least one antioxidant to the slurry with a view to stabilizing the achieved inhibition of the starch during prolonged warehouse storage.

In another aspect the present invention refers to a starch prepared with the method according to the present invention, wherein it is distinguished as having an increased viscosity when being cooked in hard water compared with when it is cooked in distilled water.

In another aspect the present invention refers to an inhibited starch with improved warehouse stability prepared with the method according to the present invention.

In still another aspect the present invention refers to the use of said inhibited starch as an ingredient in food products.

In a further aspect of the present invention is a food product containing said inhibited starch.

Thus, with the present invention it has surprisingly been found that inhibition of granular starch may be achieved by an alkali treatment using small amounts of ammonia added to the starch slurry as an alkalizing agent in combination with an oxidant, such as hypochlorite or hypochlorous acid. At the same time the formation of carboxylic acids in the starch is reduced. A product which fulfills the above-mentioned needs has not earlier been disclosed.

The use of small levels of inorganic low cost chemicals which are accepted for gentle treatment of starch ingredients to be used in food manufacturing is highly advantageous. The inhibition of the starch is obtained without use of known reactive chemical cross-linkers approved for crosslinking of starches used as food additives.

Thus, the present invention provides a method for inhibiting granular starch with the low cost inorganic ammonia or with one or more compounds which have the ability to, via an alkalization step, release bound ammonia (like in an ammonium salt of an acid) or produce ammonia, alternatively or in combination, via a deamination of an amino acid using enzymes or via a deamidation of an amide with a strong alkali or acid.

More precisely, said one or more compounds having the ability to release or produce ammonia in the slurry is/are
a) an ammonium compound, preferably an ammonium salt of an acid, preferably an ammonium acetate, chloride, or citrate, and a hydroxide compound, preferably a hydroxide of an alkali metal or an alkali earth metal, to be reacted for releasing ammonia from said ammonium compound,
b) an enzyme for releasing ammonia from amino acids already present in the slurry in rest proteins from the starch used,
c) an oxidant for releasing ammonia from a-amino acids already present in the slurry in rest proteins from the starch used, or
d) an amide, and optionally an alkali or an acid, for releasing ammonia from said amide in the slurry.

Thus, the ammonia required as reactant in the starch slurry may be provided in several different ways, as disclosed under a)-d) above. Further, amino acids may be added separately or via proteins to the slurry with a view to serving as source for ammonia for the reaction with the enzyme under b) above and the oxidant under c) above.

The granular starch produced with the method according to the present invention also has several other beneficial properties, such as viscosity stability against temperature increase, shear force, and acidic cook conditions. This means that the inhibited starch will have increased process robustness, i.e. becomes more resistant in industrial food processes.

A further advantage accompanying the present invention is that the unpleasant off-taste normally found in hypochlorite treated starches is neutralized or eliminated.

DETAILED DESCRIPTION OF THE INVENTION AND PREFERRED EMBODIMENTS THEREOF

Figure 1:
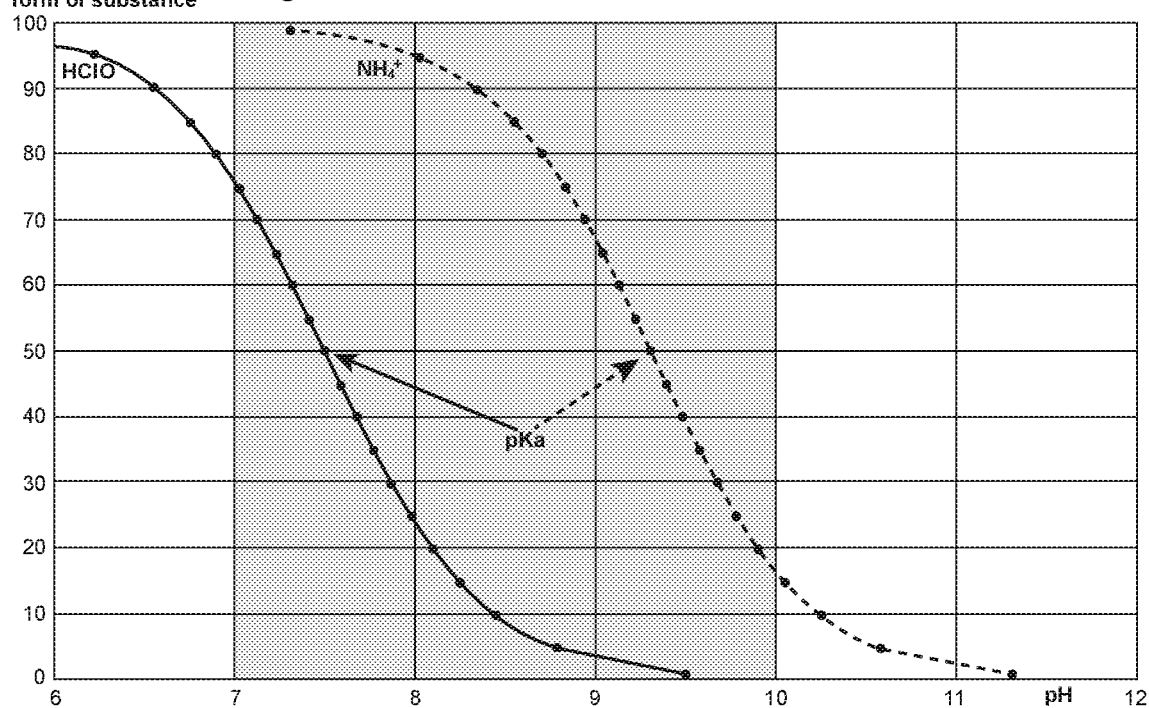
FIG. 1 shows the degree of dissociation of the acid/base forms of the reactants, i.e. hypochlorous acid and ammonia versus the pH during the reaction.

First, some expressions present in the application text will be defined.

The expression "inhibition of starch" used throughout the application text is intended to mean inhibition of the swelling of a starch granule when it is heated in water, after reaching the gelatinization point.

The expression "native starch" used throughout the application text is intended to mean an extracted and purified starch, i.e. having a residual protein content of maximum 0.4% of DM starch, preferably lower than this value, for which the naturally occurring properties have not been changed, either chemically or physically. Thereby the starch is still in its native state and has unchanged properties. The term native starch is well-known by a man skilled in the art.

The expression "warehouse storage stability" used throughout the application text is intended to mean that such an inhibited starch maintains its inhibition level during storage at typical conditions in warehouses and transports.

The expression "calculated as active chlorine" used throughout the application text is intended to mean the amount of chlorine bound in its active oxidation state, for example the amount of chlorine bound and added from the ClO⁻ in sodium hypochlorite.

The expression "DM" used throughout the application text is intended to mean "Dry Matter", which is a measure of total solids obtained from evaporating a solution under vacuum to dryness. DM may also be referred to as "total solids by drying" or "dry solids". Alternate expressions with an equivalent meaning are "dry substance" and "dry weight".

The expressions "containing active chlorine (x g/l)" and "% w/w active chlorine of DM starch" used throughout the application text is intended to mean the quantity of active chlorine added as NaClO in the active oxidant in gram per liter and in weight percentage per gram DM starch.

The expression "% w/w DM starch" used throughout the application text is intended to mean the percentage of a defined substance calculated as gram per gram of DM starch.

The expression "torsion spring of 350 cmg" used in the examples of the application text is intended to mean the setting of the Brabender Amylograph torsion spring when evaluating the viscosity profile for such a starch paste. Different torsion springs give different responses due to the sensitivity of the spring and therefore it is needed to be defined what torsion spring that have been used to understand the viscosity response level and to be able to compare different Brabender curves. The expression and meaning of "torsion spring cmg" is well-known by a man skilled in the art and is often used in the measurement of starch pastes.

The expression "slightly alkalizing" is meant a pH in the range of 7-10, i.e. only slightly above the neutral pH point which is 7.

The native starch to be inhibited in the inventive method may be extracted from a large variety of raw material, such as potato starch, maize (corn) starch, tapioca starch, barley starch, rice starch, wheat starch, rye starch, oat starch, amaranth starch, quinoa starch, sago starch, bean starches, pea starch, Floridian starch and different varieties thereof, waxy potato starch, waxy maize (corn) starch, waxy tapioca starch, waxy barley starch, waxy rice starch, waxy sorghum starch, waxy wheat starch, waxy pea starch and high amylose starches, etc. In the starch production process the starch is extracted from the raw material, purified, and dried into a powder, so called native starch. Starch from all kinds of origin, such as the above-listed raw materials, may be used in food applications, either in its native state or further modified with different technologies, to give desirable properties. The production of native starch from different sources, the methods of modification of the native starch, and its accompanying properties are well-known in the art.

In one embodiment of the method according to the present invention is using a waxy starch, i.e. an amylopectin rich starch with an amylopectin content of the starch DM of more than 90%. Amylopectin rich starches are considered to be more stable and do not have the need of stabilization by chemical mono-substitution such as acetylation and hydroxypropylation to hinder retrogradation. It is well-known that the so called waxy starches have better stability properties compared to starches with higher amounts of amylose (non-waxy starches), when it comes to stability of hydrated starch pastes after gelatinization in water. The stability property is also better for waxy starches when it comes to freeze and thaw stability. Therefore, by combining the present invention with a waxy starch i.e. waxy maize (corn), waxy tapioca, waxy barley, etc, it is possible to achieve a starch product with properties that are comparable with chemically modified non-waxy based starches. In this perspective it is possible to create a starch product that can compete with chemically modified stabilized starches, i.e. acetylated and or hydroxypropylated starches. This monosubstitution stabilization of the starch is something else than the stabilization obtained with the present invention during the storage time in the warehouses. Stabilization by monosubstitution of the starch is done in order to improve the solution stability against retrogradation and not to stabilize the inhibition.

In the method according to the present invention the properties of a native starch, or eventually a chemically modified stabilized mono-substituted starch, are changed by inhibiting the starch granule by alkalizing the starch with ammonia or adding an ammonium compound, e.g. a salt of an acid, and then alkalizing the slurry or suspension with a base, such as a hydroxide, like sodium hydroxide or potassium hydroxide or the like, in order to liberate the bound ammonia. When a pH in the range 7 to 10, preferably 8-9, is reached, a hypochlorite salt in solution or as a powder or hypochlorous acid is added and the pH is maintained during the addition by either an alkali or an acid.

The inhibited starch is achieved by using an extracted native starch and purifying it to a level where the amount of residual protein is below 0.3% w/w, wherein said starch is considered as a protein free starch. The native starch is further mixed with water resulting in starch slurry having a concentration of 5-45% w/w, more preferably 20-35% w/w, even more preferably 25-30% w/w. The starch slurry is then heated to 5-70° C., i.e. below the gelatinization temperature for the particular starch used at the surrounding pH condition, preferably 15-40° C., more preferably 25-35° C., during continuous agitation with a view to avoid sedimentation. The pH value is adjusted to be within the range 7-10, preferably 8-9, by adding an acid or alkali to control the reaction. An acidic pH is to be avoided as the active chlorine from the hypochlorite used in the process will otherwise form chlorine gas, which is undesired due to personal health risks.

Ammonia, or a source from which it can be released or liberated, is first added to the slurry. An oxidant, which also may be a bleaching agent, is then added to the starch slurry and it is then kept under agitation. The oxidant is a source of active chlorine, and is in one embodiment hypochlorite or a hypochlorous acid. In a particularly useful embodiment the oxidant is sodium hypochlorite, or another kind of alkali metal or alkali earth metal hypochlorite, such as potassium hypochlorite, calcium hypochlorite, or magnesium hypochlorite. Although different kinds of hypochlorite can be used, the present invention is not limited to such oxidants. Thus, other sources of active chlorine can be used separately or as a mixture of such different kinds of oxidants providing active chlorine. Thus, one or more different oxidants may be added to the starch slurry. Examples of such compounds are hypochlorous acid or chlorine gas dissolved in water giving hypochlorous acid and then being alkalized by addition of a base. The effect of the oxidant is not fully understood but it is clear that the oxidant is required, and it is assumed that it is in some way reacting with the ammonia source so that it catalysis internal cross bonds inside the starch granule. The assumed theory is that the oxidant in combination with ammonia is working as a catalyst so that the starch molecules can directly interact with each other's to react and form cross bonds. The added amount of oxidant is in the case of sodium hypochlorite as oxidant, calculated as the added amount as active chlorine, 0.03-30% w/w, preferably 0.1-10% w/w, more preferably 0.15-4% w/w. The slurry is then left under stirring so that the inhibition reaction can occur. This reaction is almost instantaneous, but of practical reasons it is more convenient to let the reaction proceed for a longer time with a view to avoid that residuals of active chlorine are left in the reaction vessel. The reaction time is therefore 1-1200 minutes, preferably 30-240 minutes, more preferably 30-180 minutes. The pH reaction conditions 7-10 for the reaction is such that it is the amount of free hypochlorous acid and ammonia in its free base form which is reacting. Due to the different pKa values for these ones, i.e. 7.5 for hypochlorous acid and 9.3 for ammonium ion, different amounts of the added chemicals are available for reaction due to their dissociation in water to corresponding salt/acid/base forms. This means that at above pH 10 there are almost no available free hypochlorous acid left, only hypochlorite. Below pH 7 almost all added ammonia is in its ammonium ion form and therefore no free ammonia is available for reaction. By keeping the pH range 7-10 it is possible to get the two reactants to be in reactive form and capable to react. The FIG. 1 shows a graph for the used system and the area used for the present invention.

It is well-known by a man skilled in the art that treatment of starch with hypochlorite will oxidize the starch and thus result in breakdown of the starch molecule.

This reduces the molecular weight of the starch with a consequent reduction of its viscosity. Oxidation with hypochlorite stabilizes the starch slightly against retrogradation. Therefore, it is of importance to make clear that according to the inventive method the incorporation of carboxylic groups by oxidation is avoided and, therefore, no oxidation with the breakdown of the starch structure which otherwise occurs. When the oxidation is made with an oxidation agent, e.g. hypochlorite, it creates carboxyl groups, —COOH, in the starch molecules. This is well-known by a man skilled in the art, and further specific information can be found in literature about oxidation of starch. Analysis of the level of carboxyl groups can therefore be used as a method to determine if a starch product has been oxidized or not, and also as a method to define the level of oxidation.

The method of analysis of the carboxyl group content is performed according to the official method as described in the "Purity Criteria for modified food starches" and found in FAO/WHO papers or in the EU legislation, with the adoption of the method to carry it out by titration on an ambient tempered solution rather than a hot solution and a 0.01 M NaOH solution instead of 0.1 M NaOH, in order to obtain higher accuracy.

According to International legislation, JECFA and also with EU legislation the maximum level of carboxyl groups which can be added to the starch and still being classified as a bleached starch, and thus still not be regarded as being oxidized, is 0.1% w/w DM of starch. As a consequence of this, it is thereby possible to determine if a starch product has been treated by an oxidation agent and thus have been oxidized or only bleached. It has been clarified that according to the present invention carboxyl groups are formed in the starch to a lower extent when the oxidant is combined with ammonia according to the inventive method, compared to when it is oxidized with the oxidant on its own. Thereby, it is clear that no oxidation of the starch molecule has occurred, i.e. below 0.1% added carboxyl-groups of the starch DM, rather a bleaching.

The amount of carboxylic groups is shown in Table 1 for the product according to Example 1, i.e. a waxy maize (corn) starch treated with 0.33% w/w active chlorine, 0.13% w/w ammonia in a 1/1 mole relation between ammonia and active chlorine. This starch product is compared with a native waxy maize (corn) starch as the level of carboxylic groups has to be adjusted for the level that occurs naturally in the native waxy maize (corn) starch. It can be seen that the amount of carboxylic groups added in the starch which is treated according to Example 1, i.e. 0.33% w/w of active chlorine is slightly lower than when using only hypochlorite (0.066% instead of 0.071% w/w). Thus, the increase of carboxylic groups is lower than obtained with only using the same amount of hypochlorite without any ammonia added. Thereby, it is clear that by combining the active chlorine with ammonia, an oxidation of the starch molecule is avoided and instead an inhibition of the starch granule is obtained.

TABLE 1

| Sample | DM (% w/w) | Weight of starch sample (g) | Used 0.00917M NaOH in the titration (ml) | Carboxylic groups (% w/w) | Recalculated added carboxylic groups in (% w/w) |
|---|---|---|---|---|---|
| Example 1a) 0.33% active chlorine | 87.83% | 5.6925 g | 11.05 ml | 0.091% | 0.066% |
| Example 1b) 0.33% active chlorine | 88.32% | 5.6599 g | 11.7 ml | 0.096% | 0.071% |
| Native waxy maize (corn) starch | 87.69% | 5.7019 g | 2.85 ml | 0.025% | 0% |

When the inhibition reaction has been completed, an organic acid is added prior to washing and dewatering it with a view to eliminating chemical residuals giving the starch product an unpleasant off-taste or smell of pool water, i.e. chlorinated water, which is common for starches that have been treated with hypochlorite. The kind of organic acid may be chosen from any one of the organic acids that normally are used in food products but preferred are acids which have the ability to act as a reducing agent, like ascorbic acid, which in the past have been used to reduce the formation of chloramines in drinking water after treatment of the water with sodium hypochlorite or chlorine gas. Examples of organic acids are citric acid, adipic acid, erythorbic acid, lactic acid, ascorbic acid, or salts thereof or phosphoric acid, and succinic acid. The organic acid may be added separately or in a combination of two or more of these. In one embodiment ascorbic acid is used as organic acid, as it has turned out to be particularly effective in reducing the undesired residual reactant. The added amount of organic acid is 0.001-5% w/w DM starch, preferably 0.01-3% w/w DM starch, more preferably 0.05-1% w/w DM starch. The slurry is left under stirring, e.g. for 15-60 minutes.

Alternatively, an inorganic acid, such as phosphoric acid, sulfuric acid, or hydrochloric acid can be used but the efficiency has been found to be much lower.

An alternative method of eliminating the taste and smell problem involves adding bisulfite. This is a well-known procedure for those skilled in the art to use, with a view to destroy the excess of hypochlorite ion or chlorine gas, so that it no longer possesses any oxidation capability. However, using bisulfite is not preferred, as it in International food legislation is regarded to be a potent allergen, and if there are more than 10 ppm residual levels in the starch it must be labeled as an allergen when used in food products. The inhibited starch produced so far according to the inventive method is unstable and only temporarily. This is meant that it loses its inhibition when being stored over time. When the inhibited starch is present in a slurry or after drying of it, the inhibition will break down during storage and lose its effect on regulating the swelling of the starch granule, ending up in a starch product comparable with a native non-inhibited starch. It has been found that the inhibition will break down rather rapidly, and after only a few weeks' storage time in the warehouse under normal conditions the inhibition is more or less totally lost. Similar thing occurs for the inhibited starch produced so far according to the inventive method, as well as when using the method disclosed in U.S. Pat. No. 3,463,668.

An antioxidant is added to the starch in order to stabilize the inhibition from degradation during the storage in the warehouse. The antioxidant can be selected from all available antioxidants used in food products. The added amount of antioxidant is 0.001-10% w/w DM starch, preferably 0.01-5% w/w DM starch, more preferably 0.1-3% w/w DM starch. The slurry is then left under stirring, e.g. for 15-60 minutes.

Examples of antioxidant are ascorbic acid, sodium ascorbate, calcium ascorbate, erythorbic acid, sodium erythorbate, sodium lactate, potassium lactate, calcium lactate, citric acid, mono-sodium citrate, di-sodium citrate, tri-sodium citrate, mono-potassium citrate, tri-potassium citrate, mono-calcium citrate, di-calcium citrate, tri-calcium citrate, L-tartaric acid, mono-sodium L-tartrate, di-sodium L-tartrate, mono-potassium L-tartrate, di-potassium L-tartrate, sodium potassium L-tartrate, phosphoric acid, mono-sodium phosphate, di-sodium phosphate, tri-sodium phosphate, mono-potassium phosphate, di-potassium phosphate, tri-potassium phosphate, mono-calcium phosphate, di-calcium phosphate, tri-calcium phosphate, mono-magnesium phosphate, di-magnesium phosphate, sodium malate, sodium hydrogen malate, potassium malate, calcium malate, calcium hydrogen malate, meso-tartaric acid, calcium L-tartrate, adipic acid, sodium adipate, potassium adipate, succinic acid, tri-ammonium citrate. The antioxidant used to stabilize the inhibition of the starch may be added separately or in any combination of two or more thereof after the reaction for obtaining the inhibition have taken place.

It has surprisingly also been found that starch made with the present invention that when the starch is cooked in combination with di- or three-valence ions in the water the viscosity gives rise to an increased viscosity, a phenomenon opposite from what is found when cooking potato starch in hard water, i.e. water having a high mineral content. Potato starch will give lower viscosities when cooked in hard water, while other types of native starch raw materials like maize/corn starch or tapioca is more or less unaffected when cooking it in hard water condition. The actual invention can therefore be distinguished from other types of inhibition by comparing the behavior of viscosity change from a distilled water cook with a cook in hard water condition.

The temperature at which the inhibition reaction takes place is non-thermic, i.e. may be performed at a temperature below 100° C., e.g. between 5 and 70° C. Such an inhibition is possible for slurry, in contrast to the dry heat inhibition process in which the inhibition takes place at an almost moisture free condition of the starch together with an alkaline substance like in patent application WO 2013/173161 A1 and patents U.S. Pat. No. 8,268,989 B2; EP 0 721 471; EP 1 0382 882; U.S. Pat. Nos. 3,977,897; 4,303,451; Japanese Patent No 61-254602; U.S. Pat. Nos. 4,303,452; and 3,490,917. The stabilized inhibited starch in the slurry may be further modified by use of any known modification methods used in starch production, e.g. approved food additive chemical modifications, such as acetylation, hydroxypropylation, chemical cross-linking, OSA modification, and/or physical modifications like enzymatic treatment, dextrinization, gelatinization with a view to make the starch become cold water soluble, and pre-gelatinization before inhibition with a view to make the starch cold water swell able, and/or combinations of two or more thereof. Thereafter, it can be recovered and added as an ingredient in food production. Alternatively, the stabilized inhibited starch may be recovered from the slurry by just further washing and drying it and can then be added as an ingredient to a food product.

Examples of food products in which the inhibited starch may be used are different kinds of sauces, soups, dairy products, e.g. fermented Crème Fraiche and yoghurt; batters and breading; fruit preparations for dairy products and/or baked products, e.g. bake stable fruit preparations; and milk based desserts, e.g. different puddings, vanilla sauces, ice cream, and mousse, etc.

EXAMPLES

Below some examples of the method according to the present invention are disclosed.

Example 1

Example 1a) and 1b) discloses a method for inhibition of granular starch with ammonia in combination with sodium hypochlorite having a certain content of active chlorine, and also the inhibition level that is reached in comparison with inhibition of the same native granular starch without addition of ammonia but the same added amount of active chlorine. The granular starch raw material is waxy maize (corn) starch with a residual protein content of less than 0.4% as analyzed with the Kjeldahl method and calculated with a protein conversion factor of 6.25.

1 a) 0.33% Active Chlorine+Ammonia (0.13% Nitrogen/DM Starch) in 1/1 Mole Relation Between Active Chlorine and Ammonia 869.1 g of DM waxy corn starch was mixed with 1600 g cold tap water in a reaction vessel. 5.6 g 25% $NH_3$ solution in water was added during agitation. The pH was adjusted to 9.0 with a sulfuric acid solution. The temperature was adjusted to 30° C. 56.9 g sodium hypochlorite with active chlorine 107 g/l (density: 1.19 $g/cm^3$) was added during agitation, i.e. the hypochlorite solution contained an activity of 107 g active chlorine and had a density of 1.19 $g/cm^3$. This corresponds to an addition of 0.33% w/w active chlorine of DM starch. The vessel was left under agitation for 180 min, and the temperature was kept at 30° C. The starch was neutralized to a pH of 6 with sulfuric acid and was further dewatered and dried to a dry powder with a moisture content of approximately 15%.

This example exemplifies that an inhibition with ammonia is achieved with the reaction condition at the slight alkaline pH side.

1 b) 0.33% Active Chlorine on DM Starch 869.1 g DM waxy maize (corn) starch was mixed with 1600 g cold tap water in a reaction vessel. The pH was adjusted to 9.0 with a sodium hydroxide solution. The temperature was adjusted to 30° C. 56.9 g sodium hypochlorite with active chlorine 107 g/l (density: 1.19 $g/cm^3$) was added during agitation. This corresponds to an addition of 0.33% w/w active chlorine of DM starch. The vessel was left under agitation for 180 min, and the temperature was kept at 30° C. The starch was neutralized to pH 6 with sulfuric acid and was further dewatered and dried to a dry powder with a moisture content of approximately 15%.

This example exemplifies that no inhibition is achieved with only hydroxide and hypochlorite as the alkaline agent.

The products achieved in example 1a) and 1b) were evaluated using a Brabender Amyloviscograph model E at a dry solids level of 5% w/w using distilled water and a torsion spring of 350 cmg. The evaluation was made at a neutral pH, wherein the results are shown in FIG. 2, and at a pH of 3, wherein the results are shown in FIG. 3.

Figure 2:
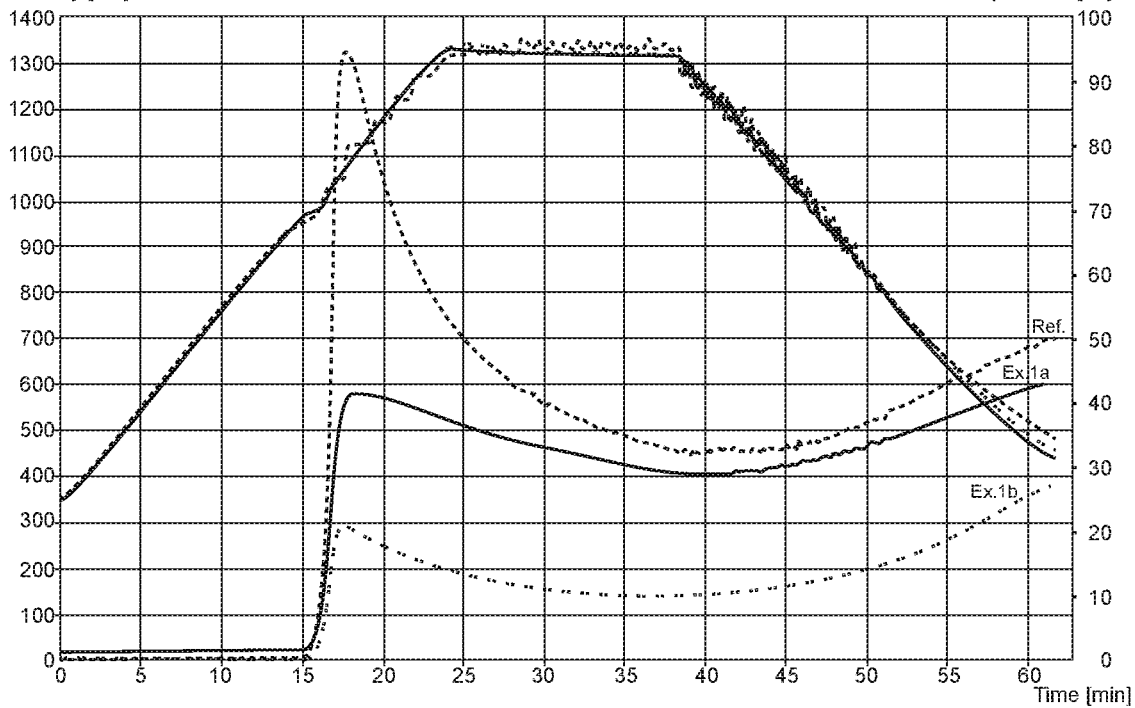
FIG. 2 shows the results obtained in Example 1 in view of inhibition of starch using active chlorine and ammonia (a)), and active chlorine without ammonia (b)), respectively, wherein the evaluation was made at a neutral pH.
Figure 3:
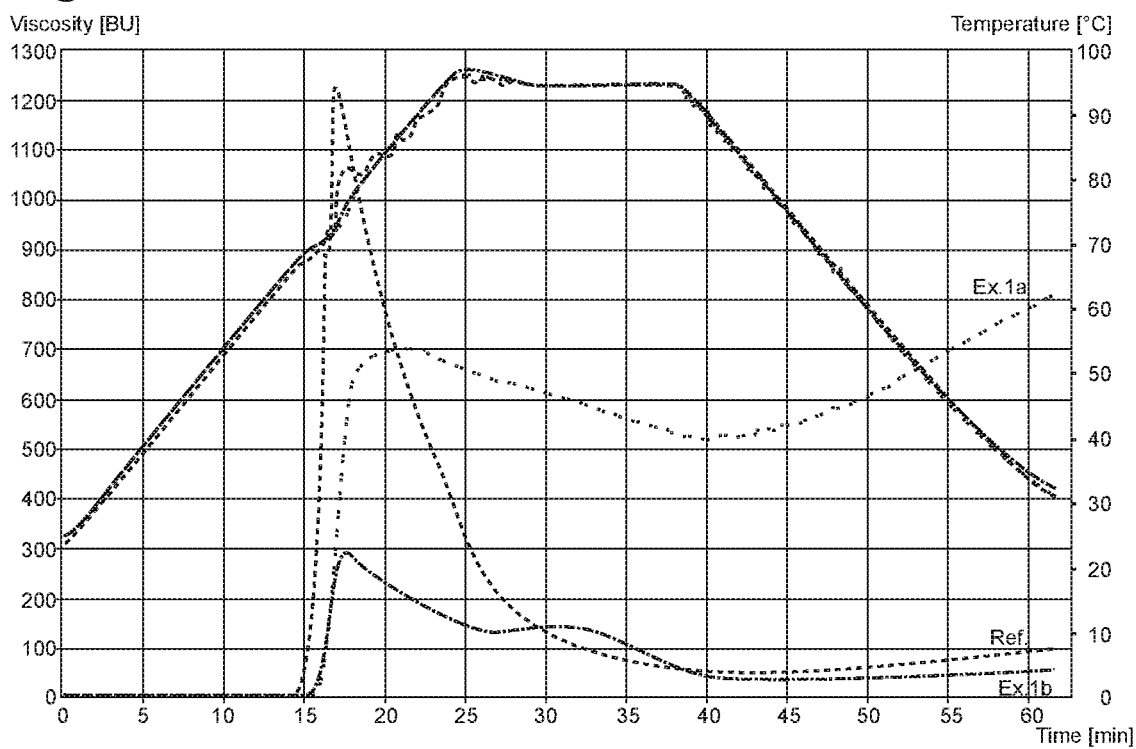
FIG. 3 shows the results obtained in Example 1 in view of inhibition of starch using active chlorine and ammonia (a)), and only active chlorine (b)), respectively, wherein the evaluation was made at a pH value of 3.

The results in FIGS. 2 and 3 illustrates that an inhibition is achieved by adding ammonia to the reaction compared with only adding sodium hypochlorite and hydroxide to the starch. This demonstrates that inhibition is reached by combining ammonia with active chlorine compared with the none inhibition reached with active chlorine alone.

Example 2

Example 2 discloses a method for inhibition of granular starch using a slight alkalization with ammonia combined with sodium hypochlorite. It further illustrates how the inhibition level is further improved by adding citric acid as antioxidant, illustrated in Example 4. It also shows that by cooking the starch together with hard water the viscosity increases. The native granular starch used in Example 2 is waxy maize (corn) starch with a residual protein content of less than 0.4% as analyzed with the Kjeldahl method and calculated with a protein conversion factor of 6.25.

2) 0.33% Active Chlorine+Ammonia (0.13% Nitrogen/DM Starch) in a 1/1 Mole Relation Between Active Chlorine and Ammonia with Addition of Citric Acid as Antioxidant 869.1 g of DM waxy corn starch was mixed with 1600 g cold tap water in a reaction vessel. 5.6 g 25% $NH_3$ solution in water was added during agitation. The pH was adjusted to 9.0 with a sulfuric acid solution. The temperature was adjusted to 30° C. 56.9 g sodium hypochlorite with active chlorine 107 g/l (density: 1.19 g/cm$^3$) was added during agitation. This corresponds to an addition of 0.33% w/w active chlorine of DM starch. The vessel was left under agitation for 180 min, and the temperature was kept at 30° C. The starch slurry was dewatered to 55% DM and further mixed with 890 g cold tap water. 2.6 g of the antioxidant, ascorbic acid, was added during agitation. The starch slurry was left under agitation for 30 minutes. The starch slurry was adjusted to a pH of 6 with sulfuric acid. 10.4 gram of the organic acid, citric acid, was added during agitation. The starch slurry was left under agitation 30 minutes and was further adjusted to pH 6 with sodium hydroxide. The starch product was further dewatered and dried to a dry powder with a moisture content of approximately 15%.

The product achieved in Example 2 was stored at ambient conditions in contact with surrounding air oxygen and was evaluated with a Brabender Amyloviscograph model E at a solids level of 5% using distilled water. A torsion spring of 350 cmg was used. The evaluation was made at neutral pH. The profiles were also compared with the product inhibited according to Example 1 in the same graph cooked both with distilled water and when being cooked in freshly made hard water condition.

Figure 4:
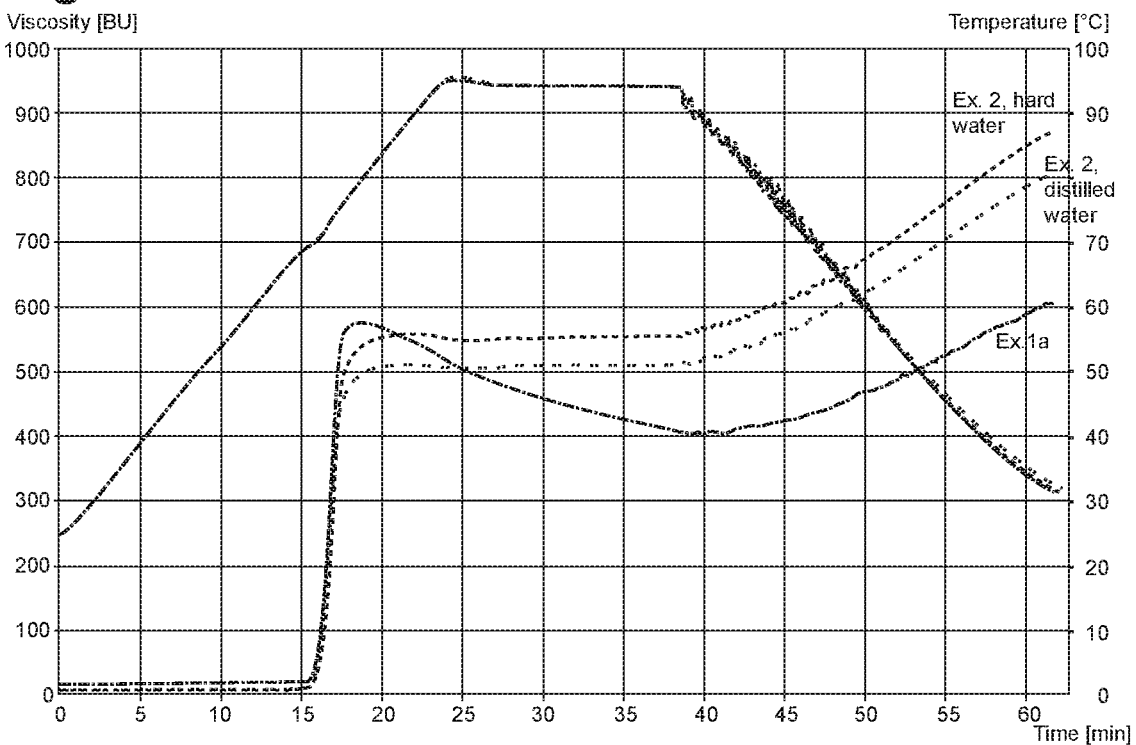
FIG. 4 shows the results obtained in Example 2 for the reaction between ammonia and sodium hypochlorite in view of the influence of the inhibition level and the viscosity by the addition of an antioxidant and using hard water.

The results from Example 2, illustrated in FIG. 4, demonstrate that the inhibition achieved by a combination between ammonia and an oxidation agent and treatment with an antioxidant after the reaction have taken place, in this example citric acid, to make it stable over the storage time in the warehouses and also that the viscosity increases when being cooked in hard water condition.

Example 3

Example 3 discloses a method for inhibition of granular starch by a slight alkalization using an ammonium salt with the ammonia bonded to it, i.e. a none-volatile salt form of ammonia, combined with sodium hypochlorite after an alkalization to the reaction pH value before addition of the hypochlorite. It illustrates the full reaction pathway to be stable also through the warehouse storage time as by adding citric acid as antioxidant as done in Example 2. The native granular starch used in Example 3 is waxy maize (corn) starch with a residual protein content of less than 0.4% as analyzed with the Kjeldahl method and calculated with a protein conversion factor of 6.25.

3 a) 0.33% Active Chlorine+Ammonium Acetate (0.13% Nitrogen/DM Starch) in 1/1 Mole Relation Between Active Chlorine and Ammonia with Addition of Citric Acid as Antioxidant 869.1 g of DM waxy corn starch was mixed with 1600 g cold tap water in a reaction vessel. 6.2 g ammonium acetate was added and dissolved in the slurry during agitation. The pH was adjusted to 9.0 with a sodium hydroxide solution. The temperature was adjusted to 30° C. 56.9 g sodium hypochlorite with active chlorine 107 g/l (density: 1.19 g/cm$^3$) was added during agitation. This corresponds to an addition of 0.33% w/w active chlorine of DM starch. The vessel was left under agitation for 180 min, and the temperature was kept at 30° C. The starch slurry was dewatered to 55% DM and further mixed with 890-gram cold tap water. 2.6 g of the antioxidant, ascorbic acid, was added during agitation. The starch slurry was left under agitation for 30 minutes. The starch slurry was adjusted to a pH of 6 with sulfuric acid. 10.4 gram of the organic acid, citric acid, was added during agitation. The starch slurry was left under agitation 30 minutes and was further adjusted to pH 6 with sodium hydroxide. The starch product was further dewatered and dried to a dry powder with a moisture content of approximately 15%.

3 b) 0.33% Active Chlorine+Ammonium Chloride (0.13% Nitrogen/DM Starch) in 1/1 Mole Relation Between Active Chlorine and Ammonia with Addition of Citric Acid as Antioxidant 869.1 g of DM waxy corn starch was mixed with 1600 g cold tap water in a reaction vessel. 4.3 g ammonium chloride was added and dissolved in the slurry during agitation. The pH was adjusted to 9.0 with a sodium hydroxide solution. The temperature was adjusted to 30° C. 56.9 g sodium hypochlorite with active chlorine 107 g/l (density: 1.19 g/cm$^3$) was added during agitation. This corresponds to an addition of 0.33% w/w active chlorine of DM starch. The vessel was left under agitation for 180 min, and the temperature was kept at 30° C. The starch slurry was dewatered to 55% DM and further mixed with 890 g cold tap water. 2.6 g of the antioxidant, ascorbic acid, was added during agitation. The starch slurry was left under agitation for 30 minutes. The starch slurry was adjusted to a pH of 6 with sulfuric acid. 10.4 gram of the organic acid, citric acid, was added during agitation. The starch slurry was left under agitation 30 minutes and was further adjusted to pH 6 with sodium hydroxide. The starch product was further dewatered and dried to a dry powder with a moisture content of approximately 15%.

3 c) 0.33% Active Chlorine+Ammonium Citrate Tribasic (0.13% Nitrogen/DM Starch) in 1/1 Mole Relation Between Active Chlorine and Ammonia with Addition of Citric Acid as Antioxidant 869.1 g of DM waxy corn starch was mixed with 1600 g cold tap water in a reaction vessel. 6.5 g ammonium citrate tribasic was added and dissolved in the slurry during agitation. The pH was adjusted to 9.0 with a sodium hydroxide solution. The temperature was adjusted to 30° C. 56.9 g sodium hypochlorite with active chlorine 107 g/l (density: 1.19 g/cm$^3$) was added during agitation. This corresponds to an addition of 0.33% w/w active chlorine of DM starch. The vessel was left under agitation for 180 min, and the temperature was kept at 30° C. The starch slurry was dewatered to 55% DM and further mixed with 890-gram cold tap water. 2.6 g of the antioxidant, ascorbic acid, was added during agitation. The starch slurry was left under agitation for 30 minutes. The starch slurry was adjusted to a pH of 6 with sulfuric acid. 10.4 gram of the organic acid, citric acid, was added during agitation. The starch slurry was left under agitation 30 minutes and was further adjusted to pH 6 with sodium hydroxide. The starch product was further dewatered and dried to a dry powder with a moisture content of approximately 15%.

Figure 5:
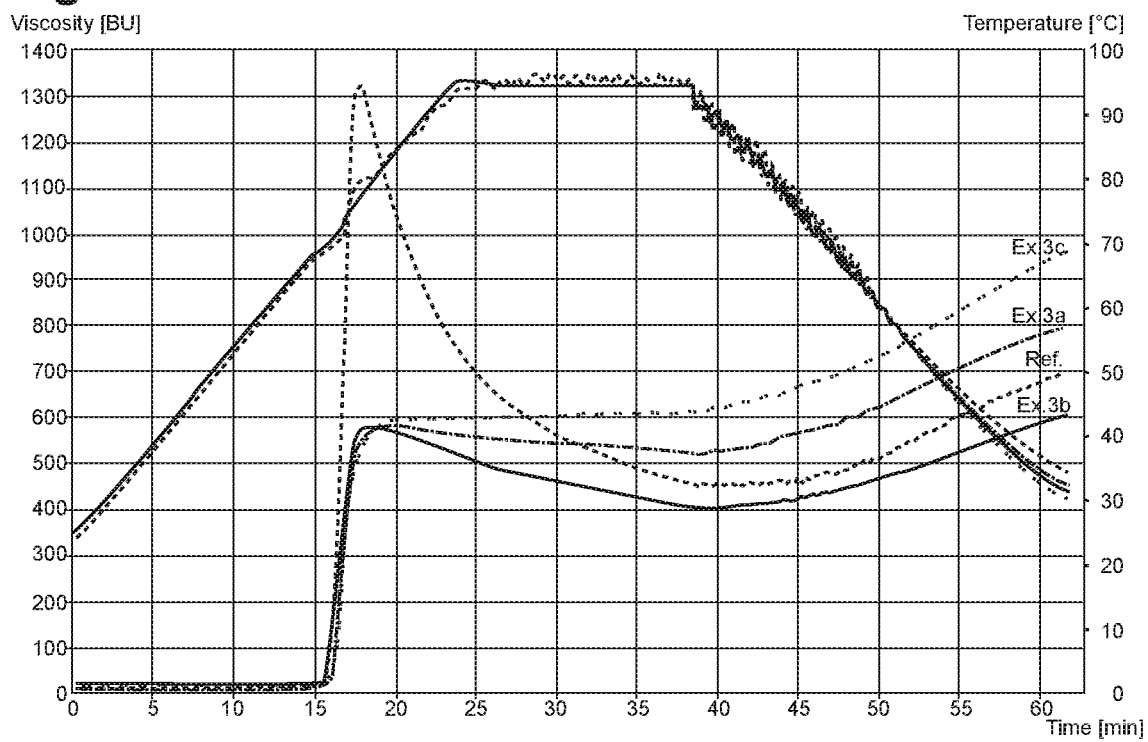
FIG. 5 shows the results obtained in Example 3 in view of the inhibition of starch by reacting sodium hypochlorite with ammonia obtained in the slurry by addition of three different ammonium salts a)-c) and use of an alkalization step.

The results from Example 3, illustrated in FIG. 5, demonstrate that inhibition is achieved by using an ammonium salt where ammonia is bonded to it and then liberated via an alkalization step and further an oxidation agent which after reaction is treated with an antioxidant, in this example citric acid, to make it stable over the storage time used in the warehouses. These are compared with the native starch raw material in neutral pH condition.

Example 4

Example 4 discloses the inhibition of granular starch using a slight alkaline pH using different molar ratio between added ammonia and the oxidant sodium hypochlorite.

4 a) 0.41% Active Chlorine+Ammonia (0.07% Nitrogen/DM Starch) in a 2.3/1 Mole Relation Between Active Chlorine and Ammonia with Addition of Citric Acid as Antioxidant 869.1 g of DM waxy corn starch was mixed with 1600 g cold tap water in a reaction vessel. 3.0 g 25% $NH_3$ solution in water was added during agitation. The pH was adjusted to 9.0 with a sulfuric acid solution. The temperature was adjusted to 30° C. 33.3 g sodium hypochlorite with active chlorine 107 g/l (density: 1.19 g/cm$^3$) was added during agitation. This corresponds to an addition of 0.41% w/w active chlorine of DM starch. The vessel was left under agitation for 180 min, and the temperature was kept at 30° C. The starch slurry was dewatered to 55% DM and further mixed with 890-gram cold tap water. 2.6 g of the antioxidant, ascorbic acid, was added during agitation. The starch slurry was left under agitation for 30 minutes. The starch slurry was adjusted to a pH of 6 with sulfuric acid. 10.4 gram of the organic acid, citric acid, was added during agitation. The starch slurry was left under agitation 30 minutes and was further adjusted to pH 6 with sodium hydroxide. The starch product was further dewatered and dried to a dry powder with a moisture content of approximately 15%.

4 b) 0.82% Active Chlorine+Ammonia (0.07% Nitrogen/DM Starch) in a 4.7/1 Mole Relation Between Active Chlorine and Ammonia with Addition of Citric Acid as Antioxidant 869.1 g of DM waxy corn starch was mixed with 1600 g cold tap water in a reaction vessel. 3.0 g 25% $NH_3$ solution in water was added during agitation. The pH was adjusted to 9.0 with a sulfuric acid solution. The temperature was adjusted to 30° C. 66.6 g sodium hypochlorite with active chlorine 107 g/l (density: 1.19 g/cm$^3$) was added during agitation. This corresponds to an addition of 0.82% w/w active chlorine of DM starch. The vessel was left under agitation for 180 min, and the temperature was kept at 30° C. The starch slurry was dewatered to 55% DM and further mixed with 890-gram cold tap water. 2.6 g of the antioxidant, ascorbic acid, was added during agitation. The starch slurry was left under agitation for 30 minutes. The starch slurry was adjusted to a pH of 6 with sulfuric acid. 10.4 gram of the organic acid, citric acid, was added during agitation. The starch slurry was left under agitation 30 minutes and was further adjusted to pH 6 with sodium hydroxide. The starch product was further dewatered and dried to a dry powder with a moisture content of approximately 15%.

4 c) 0.82% Active Chlorine+Ammonia (0.14% Nitrogen/DM Starch) in a 2.3/1 Mole Relation Between Active Chlorine and Ammonia with Addition of Citric Acid as Antioxidant 869.1 g of DM waxy corn starch was mixed with 1600 g cold tap water in a reaction vessel. 6.0 g 25% $NH_3$ solution in water was added during agitation. The pH was adjusted to 9.0 with a sulfuric acid solution. The temperature was adjusted to 30° C. 66.6 g sodium hypochlorite with active chlorine 107 g/l (density: 1.19 g/cm$^3$) was added during agitation. This corresponds to an addition of 0.82% w/w active chlorine of DM starch. The vessel was left under agitation for 180 min, and the temperature was kept at 30° C. The starch slurry was dewatered to 55% DM and further mixed with 890 g cold tap water. 2.6 g of the antioxidant, ascorbic acid, was added during agitation. The starch slurry was left under agitation for 30 minutes. The starch slurry was adjusted to a pH of 6 with sulfuric acid. 10.4 gram of the organic acid, citric acid, was added during agitation. The starch slurry was left under agitation 30 minutes and was further adjusted to pH 6 with sodium hydroxide. The starch product was further dewatered and dried to a dry powder with a moisture content of approximately 15%.

4 d) 0.82% Active Chlorine+Ammonia (0.34% Nitrogen/DM Starch) in a 1.2/1 Mole Relation Between Active Chlorine and Ammonia with Addition of Citric Acid as Antioxidant 869.1 g of DM waxy corn starch was mixed with 1600 g cold tap water in a reaction vessel. 14.4 g 25% $NH_3$ solution in water was added during agitation. The pH was adjusted to 9.0 with a sulfuric acid solution. The temperature was adjusted to 30° C. 66.6 g sodium hypochlorite with active chlorine 107 g/l (density: 1.19 g/cm$^3$) was added during agitation. This corresponds to an addition of 0.82% w/w active chlorine of DM starch. The vessel was left under agitation for 180 min, and the temperature was kept at 30° C. The starch slurry was dewatered to 55% DM and further mixed with 890-gram cold tap water. 2.6 g of the antioxidant, ascorbic acid, was added during agitation. The starch slurry was left under agitation for 30 minutes. The starch slurry was adjusted to a pH of 6 with sulfuric acid. 10.4 gram of the organic acid, citric acid, was added during agitation. The starch slurry was left under agitation 30 minutes and was further adjusted to pH 6 with sodium hydroxide. The starch product was further dewatered and dried to a dry powder with a moisture content of approximately 15%.

Figure 6:
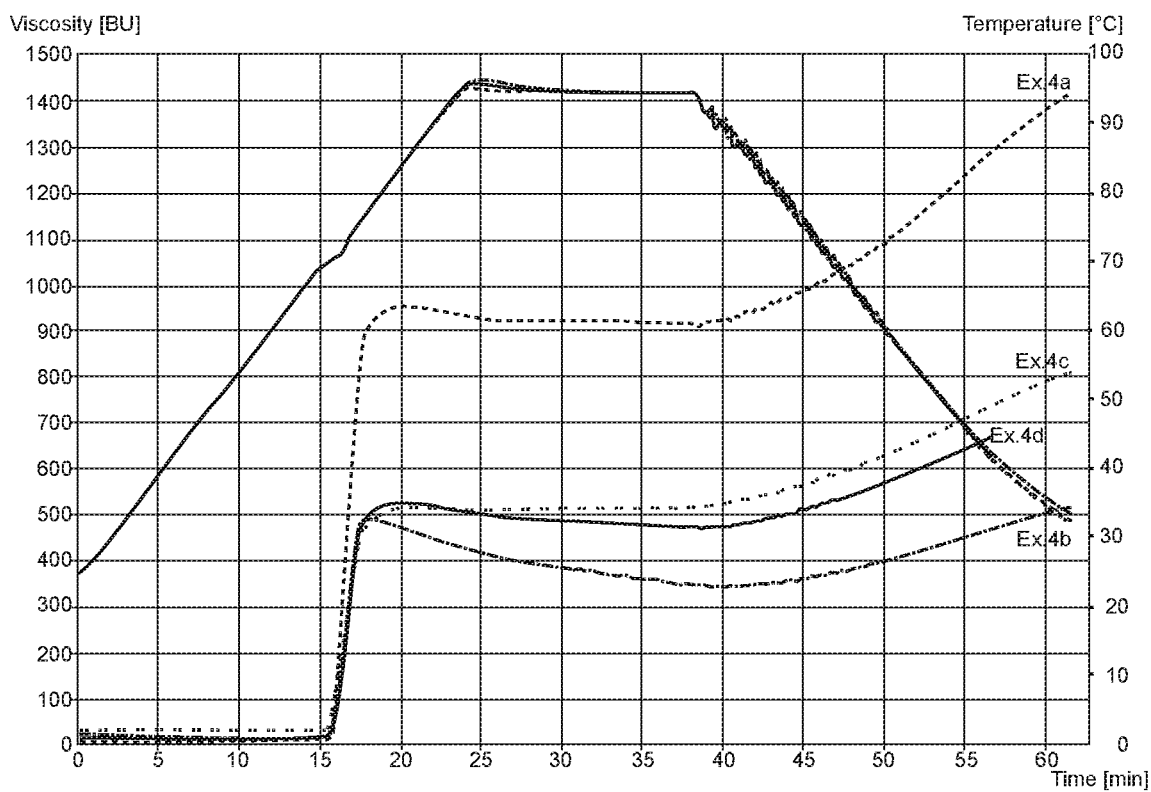
FIG. 6 shows the results obtained in Example 4 in view of the inhibition of starch by the reaction between active chlorine and ammonia using 4 different molar ratios a)-d) between added sodium hypochlorite and ammonia.

The products achieved in Example 4 were evaluated with a Brabender Amyloviscograph model E at a solids level of 5% using distilled water. A torsion spring of 350 cmg was used. The evaluation was made at neutral pH. It is seen that when the ratio of active chlorine is increased towards the nitrogen content being added via ammonia oxidation breakdown of the starch starts with a lowering of the viscosity and a drop in viscosity when being kept at the hot temperature. If the dosage of added nitrogen is increased and maintaining the addition level of active chlorine the level of inhibition is increased. The results are exemplified in FIG. 6.

Example 5

This example discloses that the method for inhibition of granular starch with ammonia in combination with sodium hypochlorite at pH 10 gives an inhibition similar to the one obtained in Example 2. The granular starch raw material is waxy maize (corn) starch with a residual protein content of less than 0.4% as analyzed with the Kjeldahl method and calculated with a protein conversion factor of 6.25.

1 a) 0.33% Active Chlorine+Ammonia (0.13% Nitrogen/DM Starch) in 1/1 Mole Relation Between Active Chlorine and Ammonia 869.1 g of DM waxy corn starch was mixed with 1600 g cold tap water in a reaction vessel. 5.6 g 25% $NH_3$ solution in water was added during agitation. The pH was adjusted to 10.0. The temperature was adjusted to 30° C. 56.9 g sodium hypochlorite with active chlorine 107 g/l (density: 1.19 g/cm$^3$) was added during agitation. This corresponds to an addition of 0.33% w/w active chlorine of DM starch. The vessel was left under agitation for 180 min, and the temperature was kept at 30° C. The starch was neutralized to pH of 6 with sulfuric acid and was further dewatered and dried to a dry powder with a moisture content of approximately 15%.

Figure 7:
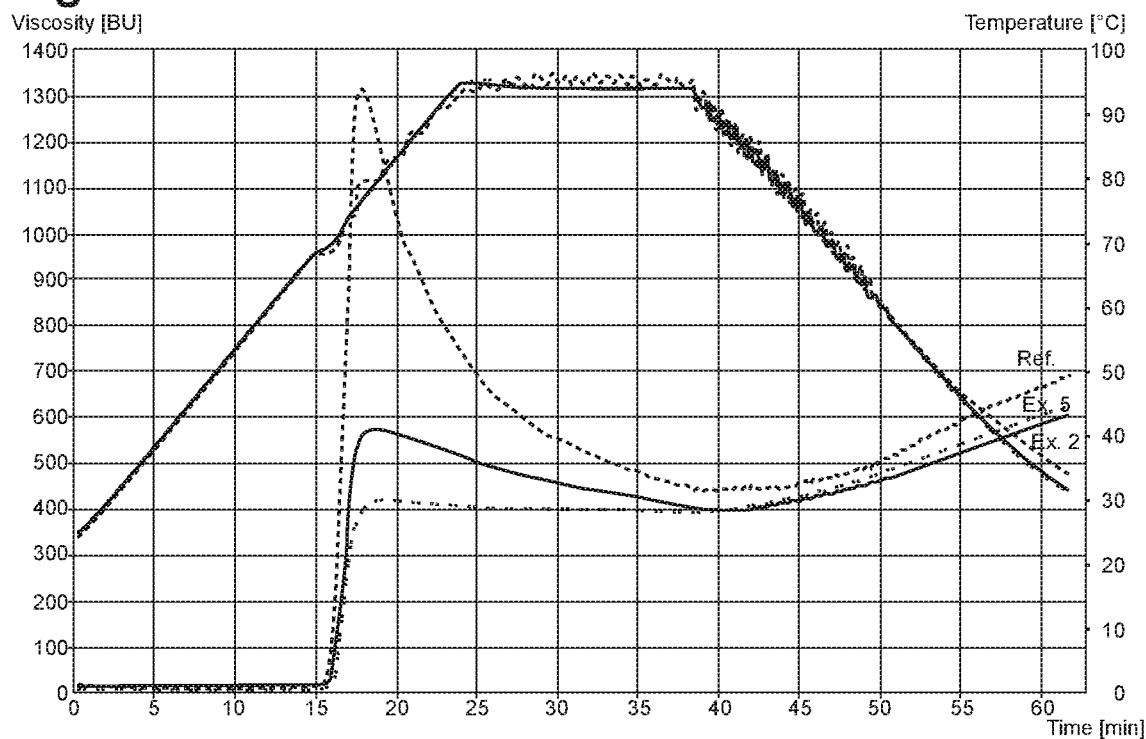
FIG. 7 and FIG. 8 show the results obtained in Example 5 in view of the inhibition of starch, wherein the results obtained in Example 2 are compared with the results obtained when the pH of the slurry is adjusted to 10.0 instead of 9.0 (like in Example 2) after the step of adding ammonia.
Figure 8:
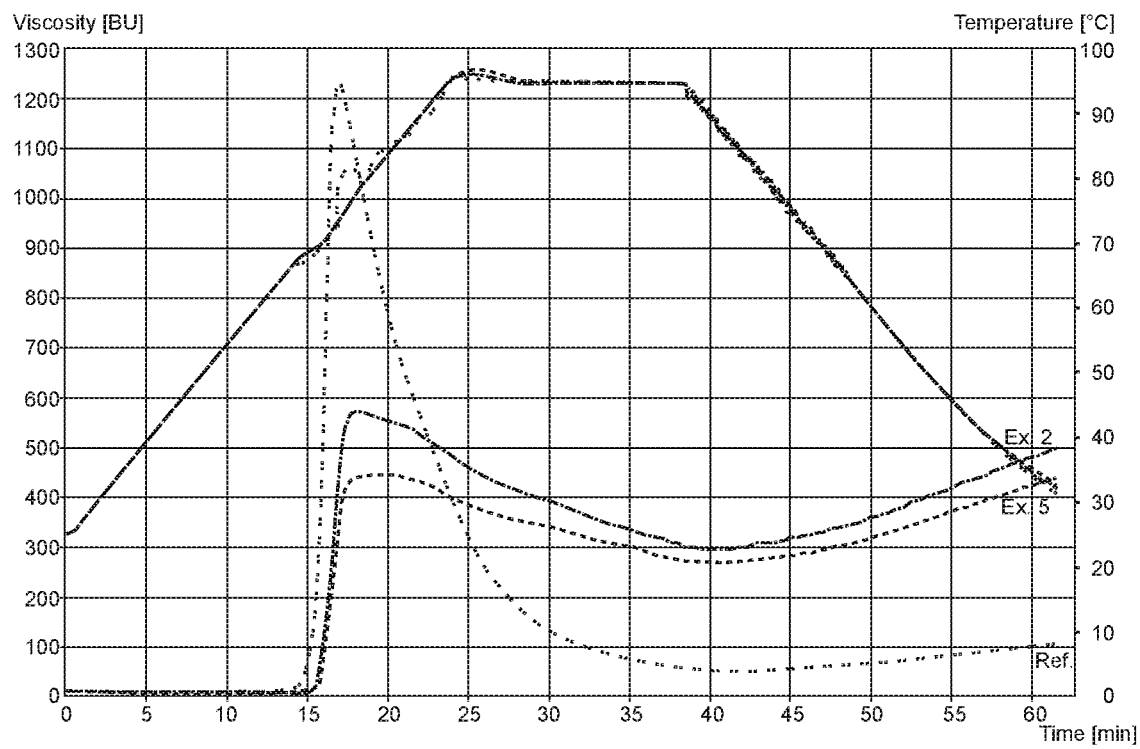

This example exemplifies that an inhibition with ammonia at pH=10.0 achieves similar results as the one obtained at pH=9.0, i.e. Example 2. The product achieved in Example 5 were evaluated with a Brabender Amyloviscograph model E at a solids level of 5% using distilled water. A torsion spring of 350 cmg was used. The evaluation was made at neutral pH as well as at pH=3.0 together with the material produced in Example 2, which has a 1/1 mole relation between hypochlorite and ammonia. The result is exemplified in FIG. 7 (neutral pH) and FIG. 8 (pH=3.0).

Example 6

The starch made according to Example 2 was suspended in distilled water at 5% DM and cooked. The starch pastes were given to a trained panel including 10 people and the starch pastes were tested for off-flavors and smell. 2 test persons were commenting on a maize/corn flavor in the starch. 8 people could not detect any off-flavors in the starch made according to Example 2.

Example 7

Fruit preparations were made with the starch produced according to Example 2 using the following basic formulation:

| | |
|---|---|
| Raspberry | 30% |
| Sugar | 30% |
| Starch | 5% |
| Water | 35% |

The starch was suspended in the water and the raspberries were mixed in. The mix was heated to boiling under agitation on a stove. When the mix started to boil the sugar was added and dissolved. The fruit preparation was cooled down and given to the same trained panel as in Example 4 for taste and flavor evaluation.

The same two test persons who commented on a maize/corn flavor in Example 4 also made the same comment on the fruit preparation prepared in this Example. 8 persons had no comments at all for off-taste or off-flavor from in the fruit preparation. 4 test persons gave comments on masked fruit flavor, which is understandable as it is made from a maize starch which is known to interact with the flavor release in delicately flavored food preparations.

While the invention has been described with reference to a number of embodiments, it will be understood by those skilled in the art that various changes may be made and equivalents may be substituted for elements thereof without departing from the scope of the present invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

The invention claimed is:

1. A method for preparing an inhibited starch, wherein it comprises the steps of
    a) providing a slurry containing a native granular starch obtained from a starch containing raw material,
    b) alkalizing the slurry by adding ammonia or by adding one or more compounds having the ability to release or produce ammonia in the slurry,
    c) adjusting the pH of the slurry to a value between 7 and 10,
    d) adding at least one oxidant being a source of active chlorine to the slurry for a reaction with said ammonia,
    e) adding at least one organic acid or a bisulfite to the slurry with a view to eliminating any residual oxidant, off-taste, and undesired smell, and
    f) adding at least one antioxidant to the slurry with a view to stabilizing the achieved inhibition of the starch during prolonged warehouse storage.

2. The method according to claim 1 wherein the ammonia added to the slurry or the ammonia released or produced in the slurry is present in an amount of the starch slurry selected from the group consisting of 0.01-10% w/w DM starch, 0.03-5% w/w DM starch, and 0.05-3.0% w/w DM starch.

3. The method according to claim 1, wherein the starch to be inhibited is potato starch, maize (corn) starch, tapioca starch, barley starch, rice starch, wheat starch, rye starch, oat starch, amaranth starch, quinoa starch, sago starch, bean starches, pea starch, Floridian starch, waxy potato starch, waxy corn starch, waxy tapioca starch, waxy barley starch, waxy rice starch, waxy sorghum, waxy wheat starch, waxy pea starch, and high amylose starches, or a combination of two or more of these.

4. The method according to claim 1, wherein said one or more compounds having the ability to release or produce ammonia in the slurry is/are
    a) an ammonium compound and a hydroxide compound, to be reacted for releasing ammonia from said ammonium compound,
    b) an enzyme for releasing ammonia from amino acids already present in the slurry residual proteins from the starch used,
    c) an oxidant for releasing ammonia from a-amino acids already present in the slurry residual proteins from the starch used, or
    d) an amide, and optionally an alkali or an acid, for releasing ammonia from said amide in the slurry.

5. The method according to claim 4, wherein the ammonium compound is selected from the group consisting of an ammonium salt of an acid, ammonium acetate, ammonium chloride, and ammonium citrate.

6. The method according to claim 4, wherein the hydroxide compound is selected from the group consisting of a hydroxide of an alkali metal and an alkali earth metal.

7. The method according to claim 1, wherein the oxidant is a hypochlorous acid or a hypochlorite selected from the group consisting of sodium hypochlorite, calcium hypochlorite, magesium hypochlorite, and potassium hypochlorite.

8. The method according to claim 7, wherein the oxidant is selected from the group consisting of hypochlorite and hypochlorous acid.

9. The method according to claim 7, wherein the oxidant is a hypochlorous acid or a hypochlorite selected from the group consisting of sodium hypochlorite, calcium hypochlorite, magnesium hypochlorite, and potassium hypochlorite.

10. The method according to claim 1, wherein the pH is adjusted to a value of 8-9 in step c) of claim 1.

11. The method according to claim 1, wherein the reaction temperature during step d) in claim 1 is 5-70° C.

12. The method according to claim 1, wherein the oxidant is added in an amount selected from the group consisting of 0.03-30% w/w DM starch, 0.05-10% w/w DM starch, and 0.1-4% w/w DM starch.

13. The method according to claim 1, wherein said at least one organic acid is citric acid, adipic acid, lactic acid, ascorbic acid and succinic acid and salt forms of these acids.

14. The method according to claim 1, wherein said at least one organic acid or bisulfite is added as antioxidant in an amount selected from the group consisting of 0.001-5% w/w DM starch, 0.01-3% w/w DM starch, and 0.05-1% w/w DM starch.

15. The method according to claim 1, wherein said at least one antioxidant is ascorbic acid, sodium ascorbate, calcium ascorbate, erythorbic acid, sodium erythorbate, sodium lactate, potassium lactate, calcium lactate, citric acid, mono-sodium citrate, di-sodium citrate, tri-sodium citrate, mono-potassium citrate, tri-potassium citrate, mono-calcium citrate, di-calcium citrate, tri-calcium citrate, L-tartaric acid, mono-sodium L-tartrate, di-sodium L-tartrate, mono-potassium L-tartrate, di-potassium L-tartrate, sodium potassium L-tartrate, phosphoric acid, mono-sodium phosphate, di-sodium phosphate, tri-sodium phosphate, mono-potassium phosphate, di-potassium phosphate, tri-potassium phosphate, mono-calcium phosphate, di-calcium phosphate, tri-calcium phosphate, mono-magnesium phosphate, di-magnesium phosphate, sodium malate, sodium hydrogen malate, potassium malate, calcium malate, calcium hydrogen malate, meso-tartaric acid, calcium L-tartrate, adipic acid, sodium adipate, potassium adipate, succinic acid, tri-ammonium citrate or a combination of two or more thereof.

16. The method according to claim 1, wherein the antioxidant is added in an amount selected from the group consisting of 0.001-10% w/w DM starch, 0.01-5% w/w DM starch, and 0.1-3% w/w DM starch.

17. The method according to claim 1, wherein the starch also is modified by acetylation, hydroxypropylation, chemical cross-linking, OSA modification, enzymatic treatment, dextrinization, gelatinization with a view to make the starch cold water soluble, and a combination of two or more thereof.

* * * * *